(12) United States Patent
Wang

(10) Patent No.: US 8,880,442 B2
(45) Date of Patent: Nov. 4, 2014

(54) METHOD FOR GENERATING A MACHINE HEARTBEAT

(75) Inventor: David J. Wang, Northville, MI (US)

(73) Assignee: Beet, LLC, Plymouth, MI (US)

( * ) Notice: Subject to any disclaimer, the term of this patent is extended or adjusted under 35 U.S.C. 154(b) by 246 days.

(21) Appl. No.: 13/486,275

(22) Filed: Jun. 1, 2012

(65) Prior Publication Data

US 2012/0310865 A1 Dec. 6, 2012

Related U.S. Application Data

(60) Provisional application No. 61/493,412, filed on Jun. 3, 2011.

(51) Int. Cl.
*G06F 15/18* (2006.01)
*G06F 11/30* (2006.01)

(52) U.S. Cl.
CPC ........ *G06F 11/3006* (2013.01); *G06F 11/3082* (2013.01)
USPC .......................................................... 706/12

(58) Field of Classification Search
None
See application file for complete search history.

(56) References Cited

U.S. PATENT DOCUMENTS

| 7,539,597 | B2 * | 5/2009 | Wegerich et al. | 702/185 |
| 2003/0139905 | A1 * | 7/2003 | Helsper et al. | 702/182 |
| 2007/0067678 | A1 * | 3/2007 | Hosek et al. | 714/25 |

* cited by examiner

*Primary Examiner* — Alan Chen
(74) *Attorney, Agent, or Firm* — Quinn Law Group, PLLC

(57) ABSTRACT

A method and system for generating a heartbeat of a process including at least one machine configured to perform a process cycle consisting of a plurality of timed events performed in a process sequence under an identified condition includes determining the duration of each of the timed events during the process cycle performed under the identified condition, ordering the durations of the plurality of timed events in the process sequence, and generating a heartbeat defined by the ordered durations of a process cycle. The identified condition may be one of a design intent, baseline, learnt, known, current or prior condition. The variance of the heartbeat between a first and at least a second identified condition may be analyzed to monitor and/or control the process or machine. The system may display the process heartbeat information and may generate a message in response to the heartbeat and/or variance thereof.

26 Claims, 4 Drawing Sheets

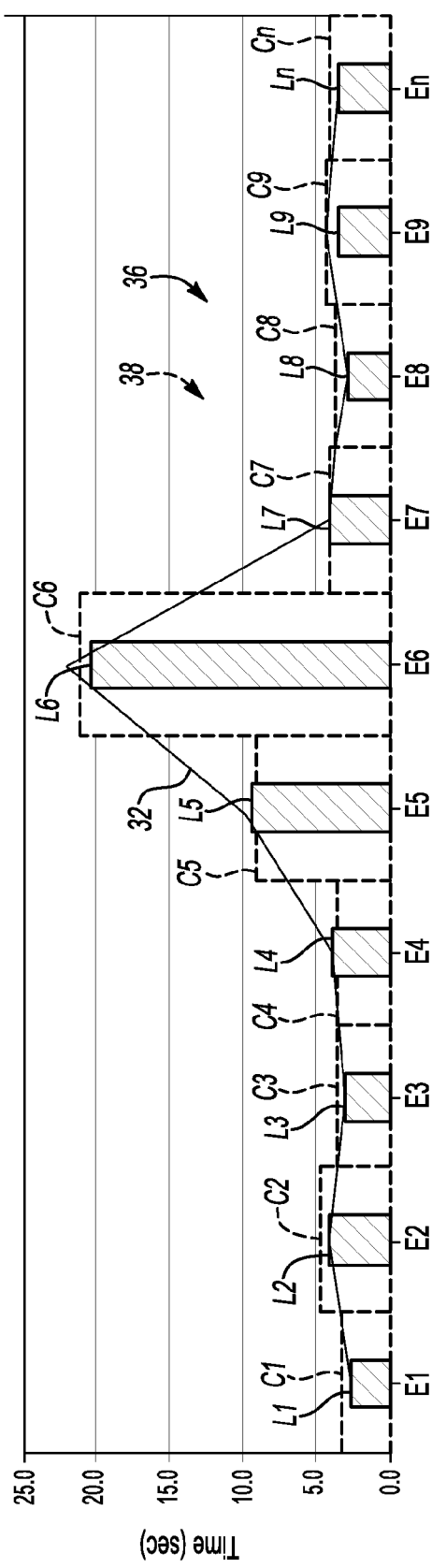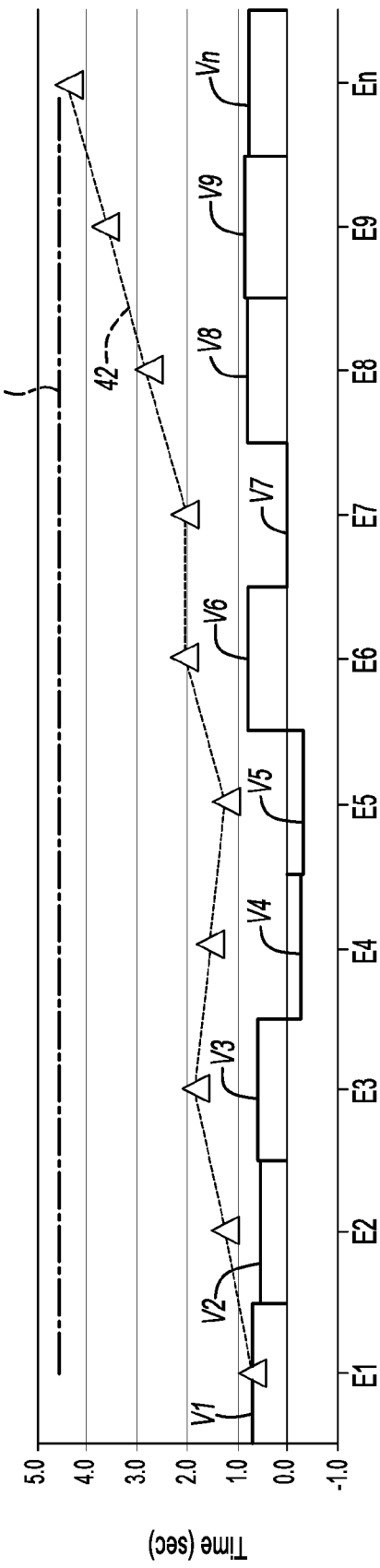
Fig-4A
Fig-4B

METHOD FOR GENERATING A MACHINE HEARTBEAT

CROSS REFERENCES TO RELATED APPLICATIONS

This Application claims the benefit of U.S. Provisional Application 61/493,412, filed Jun. 3, 2011, which is hereby incorporated by reference in its entirety.

TECHNICAL FIELD

The present disclosure relates generally to process control methods, and more particularly to a method and a system for generating a heartbeat of a process.

BACKGROUND

Most machinery operates by performing a predetermined set of events, which may also be referred to as tasks, in an ordered sequence to provide a process outcome. These events are precisely sequenced and timed according to the design intent of the process being performed by the machinery. These timed events may be initiated, controlled, monitored and/or measured by one or more computational devices, which may include controllers such as programmable logic controllers and/or programmable automation controllers, or the like.

As the process is performed, the duration of a timed event may vary from one process cycle to another as the process conditions change, which may vary the duration of the process cycle, the throughput and/or efficiency of the machinery, and/or the process outcome. Variation in the duration of a timed event may indicate a process condition trending toward a downtime condition, such as a tool or equipment failure, a process condition requiring maintenance to prevent productivity loss, a potential quality issue, or other condition affecting the process outcome. Known predictive methods of monitoring machinery and/or automated processes, such as machinery vibration analysis, may not sufficiently discriminate sources of variation to effectively predict process conditions which may require intervention to prevent downtime, productivity loss, or quality issues.

SUMMARY

A system and method are provided for generating a machine "heartbeat," where the heartbeat is defined by event durations of a plurality of timed events of a process performed by the machinery, where the event durations are ordered in the process event sequence. The heartbeat may be represented by a data sequence or graphically by a pattern. In one example, the pattern may be a bar graph pattern. In another example, the pattern may be a continuous line defined by the ordered event durations, where the "ordered event durations" are the event durations of the timed events of the process arranged in process sequence, e.g., in the order the timed events are performed by the process. The machine heartbeat may be used to measure, monitor and/or control the process by providing a comparator for evaluation of variation in event duration from one process cycle to another. Detailed understanding of variation in the event duration of the timed events from one process cycle to another process cycle performed by the machinery may be used to control and/or improve the process outcome and/or machinery capability, provide predictive or preventive identification of concerns through event duration analysis, enable causal analysis to identify causes of beneficial variation in event duration and/or eliminate or minimize causes of detrimental variation in event duration, and/or identify and/or initiate preventive interventions such as preventive maintenance or pre-failure process shutdown. The machine heartbeat may be generated for a process including a plurality of events performed in sequence by the process machinery, wherein the machinery includes at least one machine. A method for monitoring a process may include generating a series of heartbeats including a current heartbeat and one or more prior heartbeats, which may include a baseline heartbeat, a learnt heartbeat, and other prior heartbeats wherein each respective heartbeat is defined by the duration of the events of a process cycle performed under an identified condition, comparing the variance between the heartbeats and/or identifying process trends based on differences in the event durations and/or duration variances between a current heartbeat and a plurality of prior heartbeats.

The method for generating a heartbeat of a process including at least one machine configured to perform a process cycle, wherein the process cycle consists of a plurality of timed events performed in a process sequence, includes identifying a baseline duration of each of the plurality of timed events, ordering the baseline durations of the plurality of timed events in the process sequence, and generating a baseline heartbeat defined by the ordered baseline durations of a baseline process cycle. The baseline heartbeat may correspond to the design intent condition of the process, such that baseline duration of each of the timed events is the design intent duration of that timed invent identified for the process.

The method may further include generating a learnt heartbeat defined by the ordered learnt durations of a learnt process cycle, where the learnt process cycle is performed under a known condition or set of conditions. In one example, the known set of conditions of the learnt process cycle corresponds to machinery and process parameters which most closely replicate the design intent of the process. In another example, the learnt cycle is a known "good cycle" where the process outcome and/or process parameters are known to be within acceptable limits. A learnt event variance may be determined between the learnt duration and the baseline duration of each respective event in the process sequence, and may be used to generate a cumulative learnt variance. The learnt event variance and/or cumulative learnt variance may be used to establish acceptable limits for the process, against which a current heartbeat of the process can be evaluated, wherein the current heartbeat is defined by a current process cycle performed under a then current process condition, allowing real time monitoring, control and preventive or predictive analysis of the process and/or machinery.

The system and method may include generating a message, which may be provided to or displayed by a user interface or transmitted to a messaging device or to the machinery, for example, as an instruction, alert or shutdown signal. The system may include a user interface configured to display one or more heartbeats and/or related data, messages and signals, where a heartbeat may be displayed as one or more of a data table, a heartbeat data sequence, a bar graph pattern, and a continuous line pattern.

The above features and other features and advantages of the present disclosure are readily apparent from the following detailed description of the best modes for carrying out the invention when taken in connection with the accompanying drawings.

BRIEF DESCRIPTION OF THE DRAWINGS

FIG. 4A is a schematic illustration comparing the baseline heartbeat of FIG. 3D to a learnt heartbeat and a current heartbeat;

FIG. 4B is a schematic illustration of event variance and cumulative variance between the learnt and current heartbeats of FIG. 4A;

DETAILED DESCRIPTION

Figure 1:
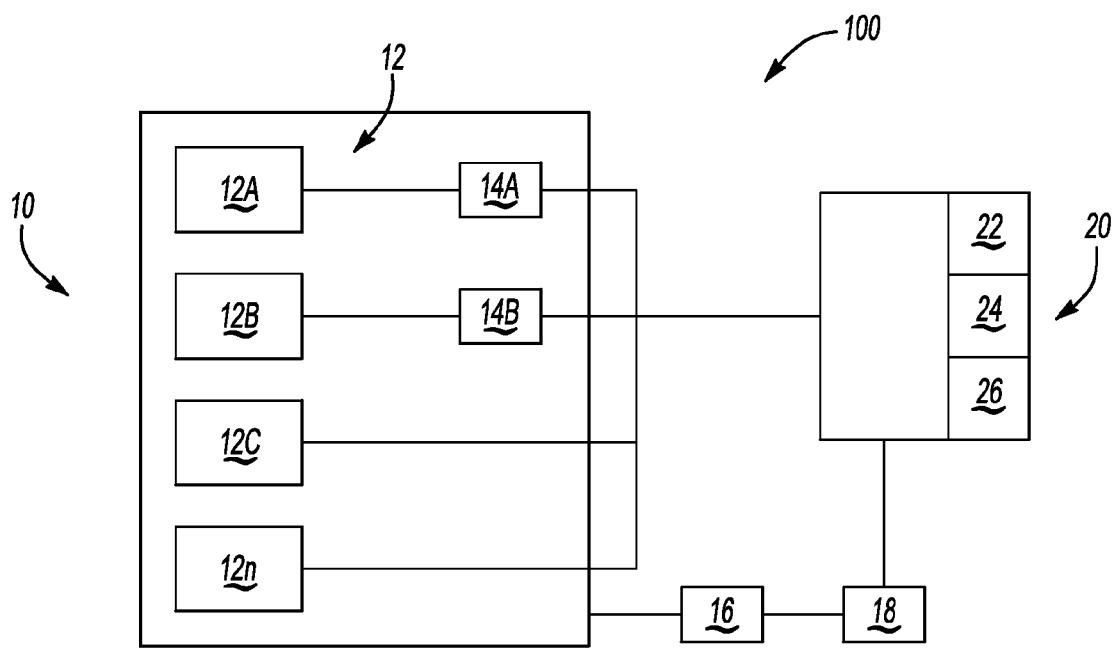
FIG. 1 is a schematic illustration of a system for generating the heartbeat of a process performed by at least one machine.

Referring to the drawings, wherein like reference numbers correspond to like or similar components throughout the several figures, FIG. 1 shows a system, generally indicated at 100, for generating a "heartbeat" of a process, where the heartbeat is defined by event durations of a plurality of timed events of a process performed by the machinery, where the event durations are ordered in the process event sequence. The heartbeat may be represented by a data sequence or graphically by a pattern. In one example, the pattern may be a bar graph pattern. In another example, the pattern may be a continuous line defined by the ordered event durations, where the "ordered event durations" are the event durations of the timed events of the process arranged in process sequence, e.g., in the order the timed events are performed by the process. The machine heartbeat may be used to measure, monitor and/or control the process by providing a comparator for evaluation of variation in event duration from one process cycle to another. Detailed understanding of variation in the event duration of the timed events from one process cycle to another process cycle performed by the machinery may be used to control and/or improve the process outcome and/or machinery capability, provide predictive or preventive identification of concerns through event duration analysis, enable causal analysis to identify causes of beneficial variation in event duration and/or eliminate or minimize causes of detrimental variation in event duration, and/or identify and/or initiate preventive interventions such as preventive maintenance or pre-failure process shutdown.

Figure 2:
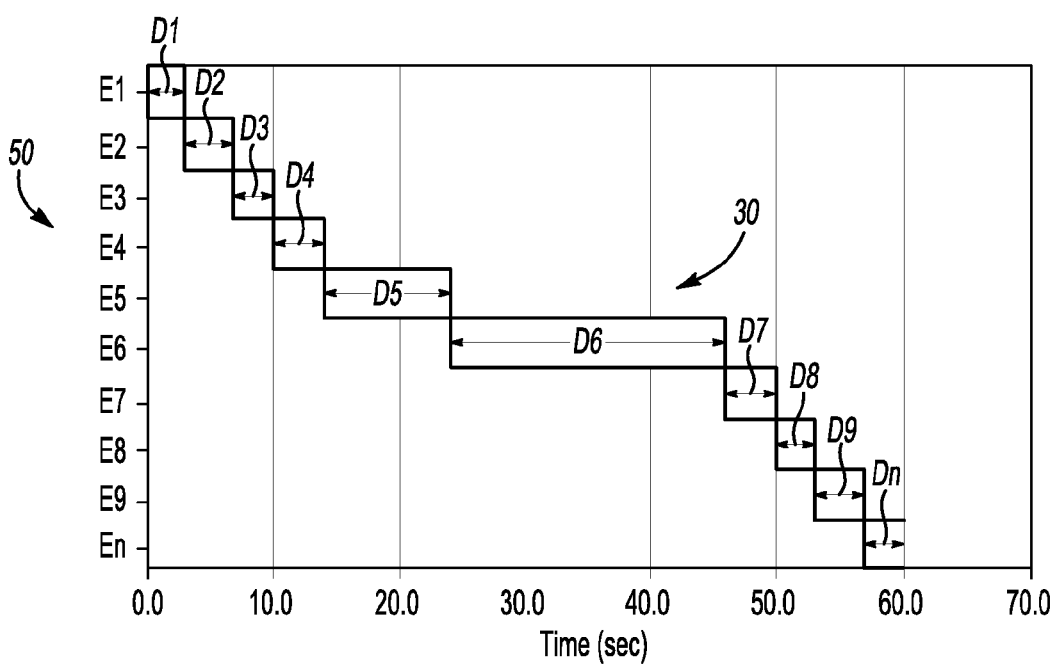
FIG. 2 is a schematic illustration of a sequence of events chart showing a process cycle including a plurality of timed events in sequenced order and a baseline duration of each of the timed events.

The process, generally indicated at 10, includes machinery generally indicated at 12 configured to perform a process cycle 30 illustrated by the sequence of events chart shown in FIG. 2. The process cycle 30 consists of a plurality of timed events E1 . . . En, performed in a process sequence 50 beginning with a first event or task E1 and ending with a last event or task En. Each of the timed events E1 . . . En is characterized by an event duration, e.g., the length of time to perform the event, which may vary based on the operating condition of the process 10 and/or machinery 12. As shown in FIG. 1, in a non-limiting example, the machinery 12 includes at least one machine, which may be one or more of the machines 12A, 12B, 12C . . . 12n, configured to perform the process 10. The machinery 12 may include a controller, which may be one or more of the controllers 14A, 14B, in communication with at least one of the machines 12A . . . 12n. The controller 14A, 14B may be configured as a programmable logic controller (PLC), a programmable automation controller (PAC), or the like. Each of the machines 12A . . . 12n and/or the machinery may be of any type configurable to perform at least one "timed event" in a sequence of events defining a process cycle of the process 10, where a "timed event" as that term is used herein is an event having a defined start and stop such that the duration of the event is measurable or otherwise determinable. The machinery 12 may be controlled by a controller, may be automated, or may otherwise be operated in a manner such that the duration of the timed event performed during a process cycle is determinable.

The system 100 may include a server 20 in communication with the machinery 12 and configured to receive event duration data from the machinery 12, and to generate a heartbeat for the process 10 including the machinery 12 using the event duration data. The server 20 may include one or more applications 22 adaptable to process the event duration data received from the machinery 12. The server 20 may include a memory 24 and a database 26 for receiving, storing, and/or providing the event duration data and data derived therefrom including variance and trend data, heartbeat data, heartbeat history, etc. within the system 100, and a central processing unit (CPU) (not shown) for executing the applications 22. The memory 24, at least some of which is tangible and non-transitory, may include, by way of example, ROM, RAM, EEPROM, etc., of a size and speed sufficient, for example, for executing the applications 22, storing the database 26, and/or communicating with the machinery 12, controllers 14A, 14B, and/or devices 16, 18.

Processing the event duration data using the applications 26 may include, by non-limiting example, one or more of generating a heartbeat based on the event duration data; associating the event duration data and/or heartbeat with the time the event duration data was provided and/or an operating condition of the machinery 12 and/or process 10 at the time the event duration data was provided; associating the event duration data with a particular machine 12A . . . 12n of the machinery 12, a particular event E1 . . . En, a machine condition, a time of the event or other event identifying information; analyzing the event duration data to generate a heartbeat, an event variance, and/or a cumulative variance; analyzing the event duration data and/or data derived therefrom to identify process trends, abnormalities or other data patterns; storing the event duration data and other data derived therefrom, including but not limited to an event variance, a cumulative variance, a heartbeat, trend data, with associated information such as event identifying information, etc. in a database 26; generating a message or signal based on the event duration data; and/or transmitting the message or signal to the machinery 12 via the controllers 14A, 14B or directly, to a user interface device 18, or to another messaging device 16 which may be in communication with the machinery 12 or process 10.

The examples provided herein are non-limiting. For example, it would be understood that the functions of the server 20 may be provided by a single server, or may be distributed among multiple servers, including third party servers, and that the data within the system 100 may be provided by databases configured other than as described for the database 26. For example, the event duration data related to machine 12A may reside in a shared database stored in the controller 14A in communication with the server 20. The database 26 may be distributed among multiple servers, including third party servers, in communication with each other and the server 20 through a network (not shown), such as the Internet, and/or directly.

Figure 3A:
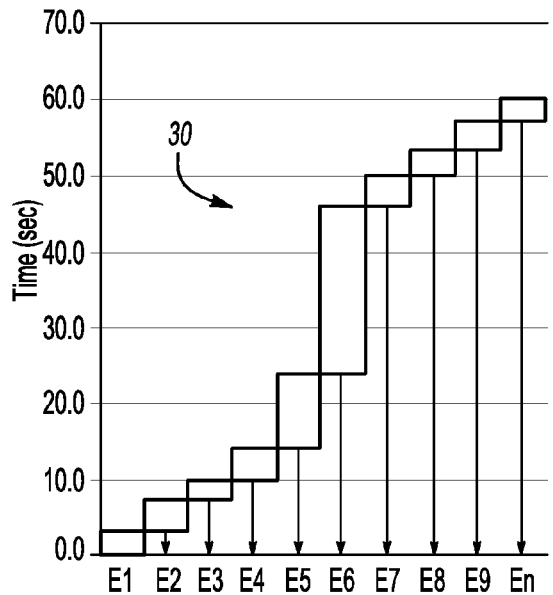
FIG. 3A is a schematic illustration of rotating the sequence of events chart of FIG. 2 and shifting each of the plurality of baseline event durations to originate at the horizontal axis to order the baseline event durations in process sequence order to form the bar graph shown in FIG. 3B.
Figure 3B:
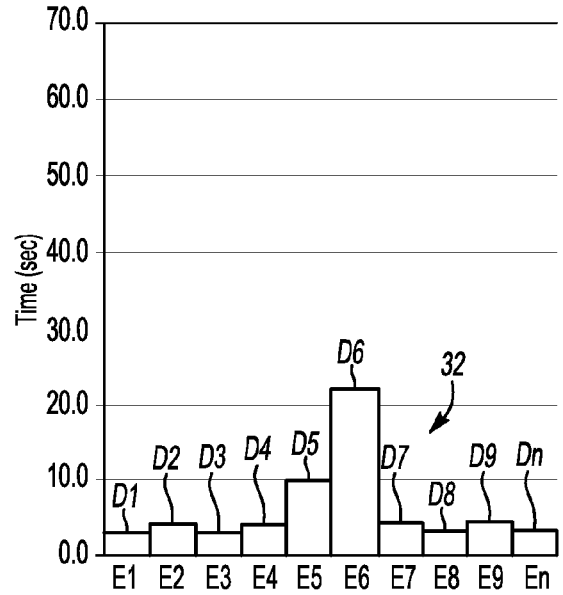
FIG. 3B is a schematic illustration of a baseline heartbeat of the process cycle of FIG. 2 defined by the ordered baseline event durations, ordered as illustrated in FIG. 3A, where the pattern of the baseline heartbeat is graphically represented by the pattern of the bar graph formed by the ordered baseline event durations.
Figure 3C:
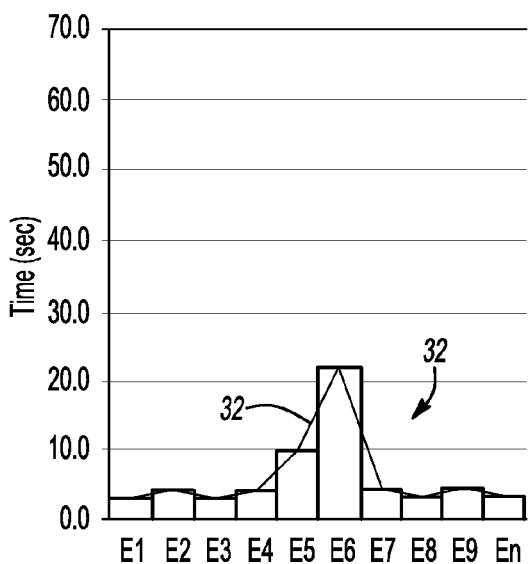
FIG. 3C is a schematic illustration showing the baseline heartbeat of the process cycle of FIG. 2, where the pattern of the baseline heartbeat is graphically represented by the pattern of the bar graph of FIG. 3B and by the pattern of a continuous line connecting the ordered baseline event durations.
Figure 3D:
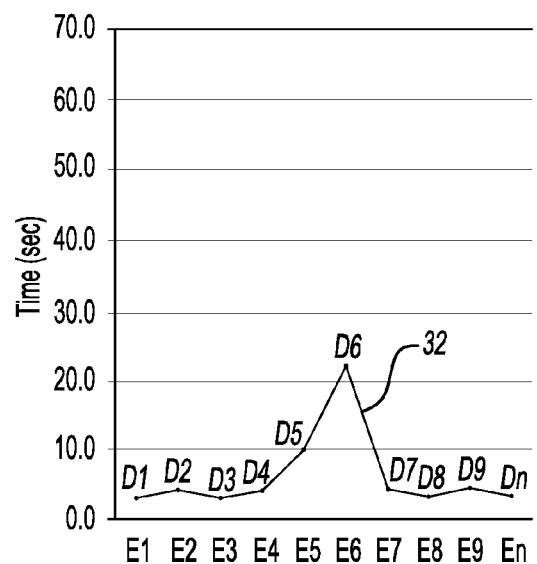
FIG. 3D is a schematic illustration of the baseline heartbeat of the process cycle of FIG. 2 where the pattern of the baseline heartbeat is graphically represented by the pattern of the continuous line connecting the ordered baseline event durations.

FIGS. 2 through 3D illustrate a method for generating a machine heartbeat, which may be, in the example shown, a baseline heartbeat 32 (see FIG. 3D), defined by event duration data D1 . . . Dn provided for the sequential timed events E1 . . . En of a process cycle 30 (see FIG. 2) to be performed by the machinery 12. In the example shown, the baseline heartbeat 32 and the baseline event duration data D1 . . . Dn corresponds to the design intent of the process cycle 30.

As illustrated by the sequence of events chart shown in FIG. 2, performing a single process cycle 30 of the process 10 consists of performing the first timed event E1, then performing the second timed event E2, and so on, until each of the plurality of timed events E1 . . . En are performed in the process sequence 50 indicated by the ordering of events E1 . . . E2 shown on the sequence of events chart to complete the process cycle 30. Each timed event E1 . . . En in the baseline process cycle 30 is characterized by a baseline event duration D1 . . . Dn, which in the example shown is the length of time to perform the event as specified by the design intent of the process 10. In a non-limiting example, where the values indicated are for illustrative purposes, each respective baseline duration D1 . . . Dn corresponding to a respective timed event E1 . . . En is shown graphically in FIG. 2 and in the data table identified as Table 1.

TABLE 1

| | E1 | E2 | E3 | E4 | E5 | E6 | E7 | E8 | E9 | En |
|---|---|---|---|---|---|---|---|---|---|---|
| Baseline Duration (D) | 3.0 | 4.0 | 3.0 | 4.0 | 10.0 | 22.0 | 4.0 | 3.0 | 4.0 | 3.0 |

A heartbeat of the process 10 may be defined by the event durations of a process cycle performed under an identified condition, where the event durations of the identified process cycle are ordered in the process sequence 50, to provide "ordered baseline durations" of the identified process cycle. As referred to herein, the "ordered event durations" are the event durations of an identified process cycle arranged in the order of the process sequence 50 to define the heartbeat of the identified process cycle, and an "identified condition" is the condition under which the process cycle is performed to provide the event duration data from which a respective heartbeat is generated. For example, referring to the baseline process cycle 30 shown in FIG. 2, the identified condition of the baseline process cycle 30 is a baseline condition, which may be the design intent condition of the process 10 and/or the machinery 12. A baseline heartbeat 32 (shown graphically in FIGS. 3B-3D) is defined by the ordered baseline event durations shown in order of the process sequence 50 in Table 1, where the baseline heartbeat 32 may also be expressed as a baseline data sequence (D1, D2, D3, D4, D5, D6, D7, D8, D9, Dn), which, using the illustrative values shown in Table 1, corresponds to the ordered baseline event durations (3, 4, 3, 4, 10, 22, 4, 3, 4, 3). Referring now to FIGS. 3A-3B, the baseline heartbeat 32 may be graphically generated by rotating the sequence of events chart of FIG. 2 to order the plurality of timed events E1 . . . En along the horizontal axis (as shown on the page) in the process sequence 50, and by shifting each of the plurality of baseline event durations D1 . . . Dn as indicated by the arrows on FIG. 3A, such that each event duration D1 . . . Dn originates at the horizontal axis, to form the bar graph shown in FIG. 3B and corresponding to the baseline heartbeat data sequence (D1,D2 . . . Dn) defined by the ordered baseline event durations D1 . . . Dn. FIG. 3B shows the pattern formed by the bar graph, which provides a graphical representation of the baseline heartbeat 32. Other graphical representations of the baseline heartbeat 32 may be defined by the ordered baseline event durations D1 . . . Dn. For example, FIG. 3C shows the baseline heartbeat 32 graphically represented by a continuous line, where the pattern of the continuous line is defined by the ordered baseline event durations D1 . . . Dn, and corresponds to the bar graph pattern generated in FIG. 3B and shown again in FIG. 3C. FIG. 3D shows the heartbeat 32 graphically represented by the continuous line, graphically showing the rhythm of the baseline heartbeat 32 defined by the ordered baseline event durations D1 . . . Dn. It would be understood that the baseline heartbeat 32 may be expressed by the baseline heartbeat data sequence (D1,D2, . . . , Dn), graphically represented by the bar graph pattern of FIG. 3B defined by the ordered baseline event durations, or graphically represented by a continuous line pattern of FIG. 3D defined by the ordered baseline event durations, wherein either graphical representation (bar graph pattern or continuous line pattern) shall be considered equivalent to the other and to the heartbeat data sequence illustrated by Table 1 in defining the baseline heartbeat 32 of the baseline process cycle 30.

As described previously, a heartbeat of the process 20 may be defined by the ordered event durations of a process cycle performed under an identified condition, where the event durations of the identified process cycle are ordered in the process sequence 50, to provide "ordered baseline durations" of the identified process cycle. It would be understood that the actual duration of a timed event during performance of the process 10 may vary from one process cycle to another based on the operating condition of and/or operating variables in the process 10 and/or the machinery 12 during that process cycle. Operating variables may include operating environmental factors such as temperature or humidity, machine maintenance or wear, tooling set-up or wear, workpiece fixturing, workpiece dimensional and/or material variation, variability in power supply, lubrication, or hydraulic pressure provided to the machinery, etc.

FIG. 4A shows a series of heartbeats 32, 36, 38 generated for the process 10, where each of the heartbeats 32, 36, 38 varies from another of the heartbeats 32, 36, 38 due to variability in the operating condition of the process 10, wherein each of the heartbeats 32, 36, 38 may be associated with an identified operating condition of the process 10 during the process cycle from which the heartbeat 32, 36, 38 is derived. The first heartbeat shown in FIG. 4A is the baseline heartbeat 32, which is graphically represented in FIG. 4A as a continuous line, and the baseline process cycle 30 (see FIG. 2) from which the baseline heartbeat 32 is generated corresponds to the design intent condition of the process 10. A second heartbeat is graphically represented in FIG. 4A as a bar graph formed of the cross-hatched bars defined by a second heartbeat data sequence (L1,L2,L3 . . . Ln) is generally indicated at 36. The second heartbeat 36 in the present example may also be referred to as a learnt heartbeat 36, where the learnt process cycle (not shown) from which the learnt heartbeat 36 is generated corresponds to a known condition of the process 10, and the learnt event durations L1, L2 . . . Ln correspond to the timed events E1, E2 . . . En performed in the process sequence 50 by the learnt process cycle.

The known condition of the learnt process cycle may be, for example, a process cycle representing optimized process and machine conditions, e.g., conditions most closely replicating design intent process cycle 30. The known optimized (learnt) process cycle and learnt heartbeat 36 derived therefrom may be used, for example, to determine the best possible process performance to be expected during actual operation of the process 10, as compared with the original design intent of the process represented by the baseline heartbeat 32. By way of example, the learnt process cycle may be a known good cycle, where a "good cycle" as used herein, is a process cycle which is within acceptable operating parameters determined for the process 10 and/or machinery 12. For example, a known good cycle may be a learnt process cycle performed within the design specification of the process 10, e.g., performed within an acceptable tolerance from the design intent process cycle 30. In another example, the known condition of the learnt process cycle may be characterized by one or more machine set-up parameters, key characteristics of the fixturing or other operating characteristics of the machine, operating environment characteristics such as operating temperatures, process outcome parameters such as finished workpiece characteristics, etc. which have been measured and recorded to establish a known set of conditions defining the learnt heartbeat 36.

The learnt process cycle may be performed by the process 10 after determining the baseline process cycle 30 from the design intent of the process 10, such that the learnt process cycle is considered to be performed subsequent to the baseline process cycle 30, and the learnt heartbeat 36 is a subsequent heartbeat of the process 10 relative to the prior baseline heartbeat 32. By comparing a subsequent heartbeat generated for a subsequent identified condition to a prior heartbeat generated for a prior condition, where subsequent and prior refer to the relative time at which the respective identified process cycle was performed from which each respective heartbeat is generated, the performance of the process 10 and/or the machinery 12 may be monitored, evaluated and/or controlled.

Comparing a subsequent heartbeat to a prior heartbeat may include, for example, determining a variance between the event duration of an event during the subsequent process cycle from which the subsequent heartbeat is derived, and the event duration of the same event during a prior process cycle from which the prior heartbeat is derived. For example, the learnt event duration L1 of the timed event E1 measured during the learnt process cycle performed by the machinery 12 may be compared with the baseline event duration D1 of the timed event E1 determined from the design intent process cycle specified for the machinery 12. The variance between the learnt event duration L1 and the baseline event duration D1 may be referred to as the learnt event variance for the timed event E1, where the learnt event variance may be used to establish the expected variance of the duration of the timed event E1 from the baseline (design intent) duration of the timed event E1 during process operation. Similarly, the variance between learnt event duration L2 and the baseline event duration D2 may be determined for the second timed event E2 in the event sequence of the process 10, and so on, such that the variance between each of the learnt events durations L1 . . . Ln and the respective baseline event durations D1 . . . Dn may be determined for each of the timed events E1 . . . En in the process sequence 50 of the process 10. The learnt event variances for the timed events E1 . . . En can then be used, for example, to provide an expected event variance for comparison with subsequent process cycles. A tolerance or limit for subsequent event variances may be established for each of the learnt event variances for the timed events E1 . . . En, which may be used in evaluating subsequent event durations, where variance of a subsequent event duration is in excess of the learnt event variance and/or a tolerance or limit established for the learnt event variance may cause the system 100 to generate a message, which may be, for example, an indication that the event corresponding to the excess event duration be further monitored or evaluated, an indication that maintenance of the machinery 12 performing the event is indicated or required, an indication that the cycle time of the process 10 may be changing in a manner which may impact a process outcome including for example, process productivity, quality or uptime, a signal to the process 10 and/or machinery 12 to modify operating conditions which may include shutting down an operation to prevent an undesirable change in process outcome, which may include shutting down an operation to prevent damage to or failure of the machinery 12 and/or related downtime, or triggering an alarm or alert.

Comparing a subsequent heartbeat to a prior heartbeat may include, in another example, determining the cumulative variance between a subsequent heartbeat defined by a subsequent process cycle, and a prior heartbeat defined by a prior process cycle. Referring again to FIGS. 4A and 4B, a learnt cumulative variance between the learnt heartbeat 36 and the baseline heartbeat 32, where the learnt heartbeat 36 is a subsequent heartbeat relative to the prior baseline heartbeat 32, may be determined by summing the learnt event variances of the timed events E1 . . . En to determine a learnt cumulative variance for the duration of the learnt process cycle relative to duration of the baseline process cycle. The learnt cumulative variance, which corresponds to line 40 in the example of FIG. 4B, can then be used, for example, to provide an expected cumulative variance for a subsequent heartbeat, such as a current heartbeat 38 shown in FIG. 4A, relative to the baseline heartbeat 32, where the expected cumulative variance corresponds to the expected variance of the total duration of the subsequent process cycle relative to the total duration of the baseline process cycle 30. The learnt cumulative variance 40 may be established as a limit 40, as shown in FIG. 4B, for comparison with or evaluation of a subsequent cumulative variance defined by a subsequent heartbeat corresponding to a subsequent process cycle. The system 100 may be configured such that when a subsequent cumulative variance of a subsequent event duration is in excess of the learnt event variance and/or limit 40, the system 100 may generate a message, which may be, for example, an indication that the machinery 12 and/or process 10 be further monitored or evaluated, an indication that maintenance of the machinery 12 is indicated or required, an indication that the cycle time of the process 10 may be changing in a manner which may impact a process outcome including for example, process productivity, quality or uptime, a signal to the process 10 and/or machinery 12 to modify operating conditions which may include shutting down an operation to prevent an undesirable change in process outcome or to prevent a damage to or failure of the machinery 12 and/or related downtime, or triggering an alarm or alert.

Referring again to FIG. 4A, a third heartbeat is generally indicated at 38 and is graphically represented in FIG. 4A as a bar graph formed of the broken-line bars defined by a third heartbeat data sequence (C1,C2,C3 . . . Cn). The third heartbeat 38 in the present example may also be referred to as a current heartbeat 38, where the current process cycle (not shown) from which the current heartbeat 38 is generated corresponds to a current condition of the process 10, and the learnt event durations C1, C2 . . . Cn correspond to the timed events E1, E2 . . . En performed in the process sequence 50 by the current process cycle. The current process cycle may be performed by the process 10 after the learnt process cycle and the baseline process cycle 30, such that the current process cycle is considered to be performed subsequent to the learnt and baseline process cycles, and the current heartbeat 38 is a subsequent heartbeat of the process 10 relative to the learnt heartbeat 36 and relative to the baseline heartbeat 32, where the learnt and baseline heartbeats 36, 32 may be referred to as prior heartbeats of the process 10 relative to the current heartbeat 38.

The current process cycle is performed under a current condition, e.g., the actual operating condition of the process 10 and/or machinery 12 existing at the time the current process cycle is performed. As such the current condition includes and/or reflects changes in process operating parameters of the process 10, machine operating parameters of the machinery 12, workpiece characteristics of the workpiece (not shown) being processed by the machinery 12, or other sources of process variation, which may include, for example, variation in environmental conditions influencing process performance and/or output such as temperature, humidity, incoming power source characteristics, or the like existing at the time the current process cycle is performed. By comparing the current heartbeat 38 to at least one prior heartbeat 32, 36, the performance of the process 10 and/or the machinery 12 may be monitored, evaluated and/or controlled in real time, e.g., at the time the current process cycle defining the current heartbeat 38 is performed. Further, by comparing a subsequent heartbeat, such as the current heartbeat 38, to a plurality of prior heartbeats which may include the baseline heartbeat 32, the learnt heartbeat 36, and/or another current heartbeat generated subsequent to the learnt heartbeat 36 and prior to the current heartbeat 38, where the another current heartbeat is a prior heartbeat relative to the current heartbeat 38, process trends may be evaluated and/or identified based on the comparison of at least one of the current event variance and the current cumulative variance of the current heartbeat 38.

Comparing the current heartbeat 32 to the learnt heartbeat 36 may include, for example, determining a current event variance between the current event duration of a timed event determined during the current process cycle, and the learnt event duration of the same event determined during the learnt process cycle. For example, and referring to FIGS. 4A and 4B, the current event duration C1 of the timed event E1 measured during performance of the current process cycle may be compared with the learnt event duration L1 of the timed event E1 determined from the learnt process cycle. The variance between the current event duration C1 and the learnt event duration L1 for the timed event E1 is shown in FIG. 4B as the current event variance V1, where the current event variance V1 may be used to evaluate the current process condition by comparing the current event variance V1 to the learnt event variance for the timed event E1.

Similarly, the current event variance V2 between current event duration C2 and the learnt event duration L2 may be determined for the second timed event E2 in the event sequence of the process 10, and so on, such that the current event variance V1 . . . Vn between each of the current event durations C1 . . . Cn and the respective learnt event durations L1 . . . Ln may be determined for each of the timed events E1 . . . En in the process sequence 50 of the process 10. The current event variances V1 . . . Vn for the timed events E1 . . . En can be evaluated and used to monitor the current operating condition of the process 10 and/or the machinery 12, which may include generating a message using the system 100 in response to one or more of the current event variances V1 . . . Vn, and/or process trends identified by the system 100. The message may be, for example, an indication that the respective event corresponding to the current event variance V1 . . . Vn to which the message is related may required further monitoring or evaluation, an indication that maintenance of the machinery 12 performing the respective event is indicated or required, an indication that the cycle time of the process 10 may be changing in a manner which may impact a process outcome, and/or a signal to the process 10 and/or machinery 12 to modify operating conditions which may include shutting down an operation to prevent damage to the machinery 12 and/or process downtime.

Referring again to FIGS. 4A and 4B, a current cumulative variance between the current heartbeat 32 and the learnt heartbeat 36 may be determined by summing the current event variances V1 . . . Vn of the timed events E1 . . . En to generate the current cumulative variance 42 for the current process cycle relative to the learnt process cycle shown in FIG. 4B. The current cumulative variance 42 may be compared at any point in the event sequence 50 (E1, E2, . . . En) to determine whether the current cumulative variance 42 at that point in the event sequence 50 of the current process cycle has exceeded a limit. The limit may be, in the example shown in FIG. 4B, the limit 40 defined by the learnt cumulative variance. The system 100 may be configured such that when the current cumulative variance 42 exceeds the limit 40 at any point in the event sequence 50, the system 100 may generate a message, which may be, for example, a maintenance indication, a cycle time indication, a signal to modify and/or shutdown a portion or all of the process 10 and/or machinery 12, or the like, as previously described herein.

The baseline, learnt and current heartbeats 32, 36, 38 defined respectively by baseline, learnt and current process cycles performed by the process 10, and prior heartbeats (not shown) defined by prior process cycles performed by the process 10 prior to the current heartbeat 38 may be collected, stored and analyzed using the system 100. Collecting and storing the heartbeats may include collecting and storing the heartbeat data sequences of each respective heartbeat, which may include, for example, a baseline heartbeat data sequence (D1,D2 . . . Dn), a learnt heartbeat data sequence (L1,L2 . . . Ln), and/or a current heartbeat data sequence (C1,C2 . . . Cn) used to respectively define the baseline, learnt and current heartbeats 32, 36, 38. Analyzing the heartbeats may include determining one or more of event variances and/or a cumulative variance between respective heartbeats, and/or comparing a determined variance to a variance limit or tolerance established for the determined variance. For example, analyzing the current heartbeat 38 may include determining one or more current event variances V1 . . . Vn, comparing a current event duration C1 . . . Cn with a respective learnt event duration L1 . . . Ln or a respective baseline event duration D1 . . . Dn, determining a current cumulative variance 42 and/or comparing the current cumulative variance 42 with a cumulative variance limit 40, and the like.

The variance between the baseline, learnt, and current heartbeats 32, 36, 38 may be used to measure, monitor and/or control the process 10 by comparing the variation in the current duration C1 of a respective event, for example, event E1, to the baseline and/or learnt duration D1, L1 of the respective event. In another example, the current cumulative variation 42 of the plurality of events E1 . . . En comprising the process cycle 30 may be compared to the learnt cumulative variation 40 of the plurality of events E1 . . . En. Detailed understanding of variation of event duration of the timed events E1 . . . En and/or the cumulative variance of the plurality of timed events performed by a first identified process cycle of the process 10 relative to at least a second identified process cycle may be used to control and/or improve the process 10 performed by the machinery 12, by identifying significant fluctuations in event duration through variance and/or trend analysis of the heartbeat defined by the first identified process cycle compared to at least a second identified heartbeat defined by a respective identified process, where the at least second identified heartbeat(s) may including one or more prior heartbeats, which may include the learnt and/or baseline heartbeats 36, 32.

Referring again to FIG. 1, the system 100 may be configured to output information related to the process 10, machinery 12, including heartbeat information to an output device, which may be one of the devices 16, 18. Each of the devices 16, 18 may be in communication with or operatively connected to one or more of the server 20, the machinery 12, the controllers 14A, 14B, and/or to each other, in a wireless or wired configuration, and may be configured to exchange information and/or data therebetween. In one example, the device 18 may be a user interface device configured to output information related to the process 10, machinery 12, event duration data and/or process heartbeats derived therefrom. The outputted information may include, by way of non-limiting example, a display of one or more process heartbeats or heartbeat history, which may be displayed textually and/or graphically, event duration information, identified process conditions corresponding to a heartbeat which may include identified machine or process parameters, heartbeat variance information including event variance, cumulative variance, variance analysis, trend analysis and other information derived from the event duration information collected from the process 10 and/or machinery 12, messages, alerts, alarms, etc. The output device 18 may include at least one of a visual display, audio output, report generator, printer, data port, or other output device configured to receive data from the server 20, through which data may be transferred to a user or another device.

By way of example, the output device 16 may be configured as a signaling or messaging device, and may be configured to output a signal or message to one or more of the process 10, machinery 12, server 20, output device 16 or other device (not shown) in communication with the messaging device 16. The output device 16 may be configured to output the signal or message as one or more of an electronic, visual, or audible signal or message. The outputted signal or message may include a signal, message or instruction sent to the process 10 and/or machinery 12 to modify or shutdown a portion or all of the process 10 and/or machinery 12, where the signal may be generated in response to a heartbeat defined by the process 10 and/or machinery 12, or information derived from analysis of the heartbeat. In one example, the messaging device 16 may be configured to communicate the signal or message to a user device (not shown), which may be a portable user device such as a smart phone, notebook, laptop or other computing device, to communicate the signal or message to a user of the user device, such that the user may initiate an action in response to the signal or message, where the action may be one of a maintenance action or other action affecting the process 10 and/or machinery 12. The example shown in FIG. 1 is intended to be non-limiting, and it would be understood that the functions performed by one or both of the output devices 16, 18 may be performed by another of the devices included in the system 100, such as the server 10, controller 14, etc.

Figure 5:
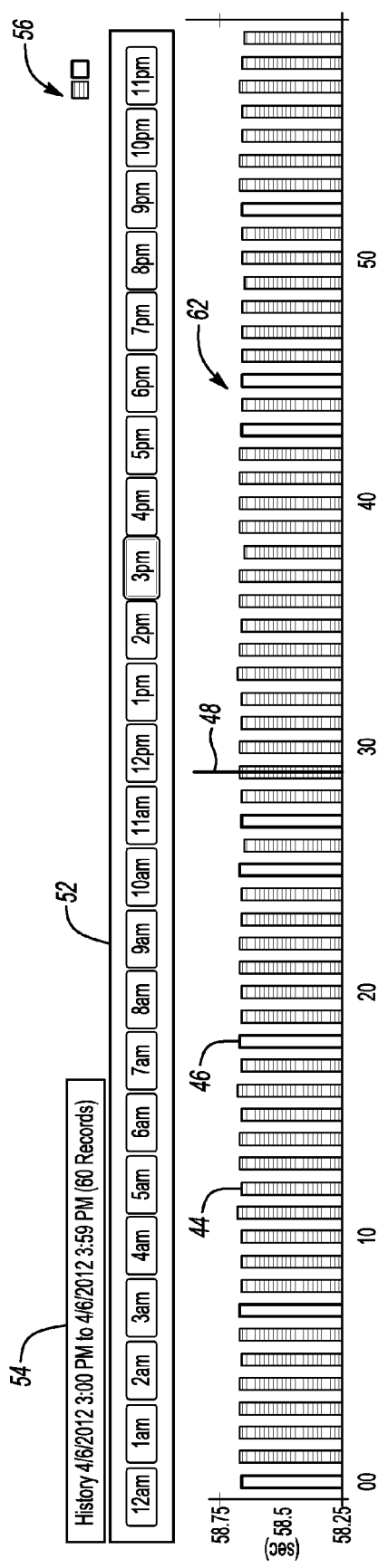
FIG. 5 is a schematic illustration of a sample history of process cycle duration information.

Referring now to FIG. 5, shown is a non-limiting example of a process information display which may be generated by and outputted from the system 100, using the timed event duration data collected from the process 10 over a period of time. The display shown in FIG. 5 may be displayed, for example, by one of the output devices 16, 18, a controller 14A, 14B, or outputted to another device for display. The process information display of FIG. 5 shows a time series 62 of a sampling of process cycle duration measurements taken over a sample period indicated at 54. The sample period 54 may be selected for display from a time period menu 52. In the example shown, the time period menu 52 provides one hour sample period intervals to select from, and a 24 hour period is shown. In the example shown, the sample period 54 is a one hour period from 3:00 pm to 3:59 pm, and the time series 62 is configured to show process cycle duration samples taken at one minute intervals. For example, sample 44 represents the duration of the process cycle performed at 3:13 pm, and sample 46 represents the duration of the process cycle performed at 3:18 pm. It would be understood that the display may be configured for other durations of time period menus 52 and/or sample periods 54, other sample frequencies, etc., to provide different levels of discrimination of the information displayed. For example, the sample period 54 may be a ten minute period with a sampling interval of 20 seconds, to provide a more detailed view of variability in the duration of the process cycles of the process 10.

The process cycle duration, as shown in FIG. 5, represents the total duration of a process cycle. Using the example of the baseline cycle 30 shown in FIG. 2 and the example data provided in Table 1, the total duration of the baseline process cycle 30 would be the summation of the durations D1 . . . Dn of the timed events E1 . . . En comprising the process cycle 30. For the example shown in FIG. 2 and Table 1, the total duration of the baseline process cycle 30 would be 60, e.g., the summation of the baseline event durations (3, 4, 3, 4, 10, 22, 4, 3, 4, 3). Referring again to FIG. 5, a cursor or selector 48 may be configured to allow a user to select a process cycle sample in the series 62 to retrieve additional information. In the example of FIG. 5, the selector 48 has selected the process cycle performed at 3:32 pm, which may prompt the system 100 to provide detailed information, which may include, for example, a display of event duration information similar to that shown in FIGS. 4A and/or 4B, for the selected process cycle.

Each sample in the time series 62 may be visually coded according to a key 56 to provide additional information to the user viewing the display. In the example shown, the key 56 includes a cross-hatched bar and a solid bar, each which may represent a different condition. For example, the samples displayed by a cross-hatched bar may represent samples, such as the sample 44, for which the heartbeat variance is within an acceptable limit. Samples displayed by a solid bar may represent samples, such as the sample 46, where the heartbeat variance is outside an acceptable limit. Further visual indicators may be included. For example, the solid bar may be a first color to indicate an event variance is outside an acceptable limit for the sample, and the solid bar may be a second color to indicate the cumulative variance is outside an acceptable limit for the sample. The example shown in not intended to be limiting. By displaying a time series 62 of process cycle durations over a sample period 54, a visual indication of the variability of and trending in process cycle duration over multiple process cycles performed by the process 10 may be provided. Such an analysis may be useful, for example, to look for trends corresponding to changes in operating conditions of the process 10 and/or machinery 12, which may include changes in environmental factors such as temperature or power fluctuations from one time period to another, process or tooling changes, set-up or maintenance events, changes in incoming material or workpiece parameters, etc.

Figure 6:
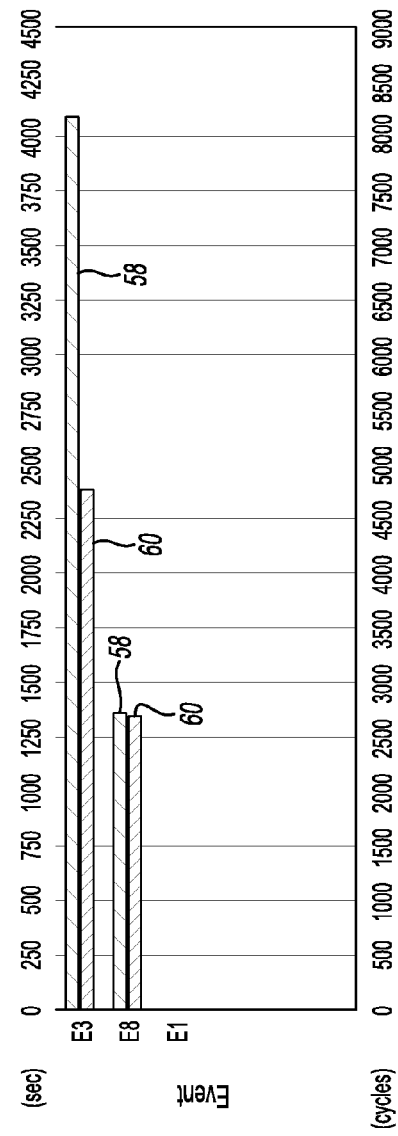
FIG. 6 is a schematic illustration showing over cycle frequency and accumulated variance by timed event.

Referring now to FIG. 6, shown is another non-limiting example of a process information display which may be generated by and outputted from the system 100, using the timed event duration data collected from the process 10 over a period of time. The display shown in FIG. 6 may be displayed, for example, by one of the output devices 16, 18, a controller 14A, 14B, or outputted to another device for display. The process information display of FIG. 6 shows an over cycle frequency 58 and an accumulated variance 60 for one or more individual timed events in the process sequence 50. The over cycle frequency 58 refers to the number of times the duration of the timed event has exceeded the duration of a reference event measured during performance of a reference cycle. By example, the over cycle frequency of the timed event E3 shown in FIG. 6 may represent the number of times (frequency) during a sample period (not shown) of process operation that the current duration C3 of each the timed event E3 performed during the sample period exceeded the learnt duration L3 of the event E3, where the reference cycle is the learnt cycle. The accumulated variance 60 refers to the summation of the event variances of the timed event over the sample period relative to the reference event. By example, the accumulated variance of the timed event E3 shown in FIG. 6, where the reference cycle is the learnt cycle, would be the summation of the current variances V3 measured for the process cycles performed during the sample period, which would indicate the total productive time loss attributable to variance of the timed event E3 during the sample period.

Other information may be provided by FIG. 6. For example, the average variance per over cycle may be visually approximated for each timed event. As shown for timed event E8, during the sample period shown, the variance of timed event E8 averaged approximated 0.5 seconds per over cycle. The timed events may be displayed in ranked order according to the event's frequency of over cycles and/or accumulated variance, for example, in the order E3, E8, E1 in FIG. 6, to facilitate identification of those events to be prioritized for investigation and/or corrective action. Other displays, including displays of tabular data and/or other graphical analysis, of the event duration, cycle duration, heartbeat and/or data derived therefrom may be provided, and the examples shown are not intended to be limiting.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for generating a heartbeat of a process, wherein the process includes at least one machine performing a process cycle, and wherein the process cycle includes a plurality of timed events performed in a process sequence, the method comprising:

identifying a baseline duration of each of the plurality of timed events of a baseline process cycle;
ordering the baseline durations of the plurality of timed events in the process sequence; and
generating, via a server, a baseline heartbeat defined by the ordered baseline durations of the baseline process cycle.

2. The method of claim 1, wherein the baseline duration of each of the plurality of events is the design intent duration of the respective event.

3. The method of claim 1, further comprising:
performing a learnt process cycle under a known condition;
measuring a learnt duration of each of the plurality of timed events, wherein the learnt duration of each of the timed events corresponds to the duration of the respective timed event while performing the process cycle under the known condition;
ordering the learnt durations of the plurality of timed events in the process sequence; and
generating a learnt heartbeat defined by the ordered learnt durations.

4. The method of claim 3, further comprising:
determining a learnt event variance between the learnt duration and the baseline duration for each of the plurality of timed events.

5. The method of claim 4, further comprising:
determining a learnt cumulative variance between the learnt heartbeat and the baseline heartbeat;
wherein the learnt cumulative variance is defined by the sum of the learnt event variances of the plurality of timed events.

6. The method of claim 3, wherein the known condition includes at least one known process parameter.

7. The method of claim 6, further comprising:
providing a process specification for the process;
wherein the at least one known process parameter complies with the process specification.

8. The method of claim 1, further comprising:
performing a current process cycle under a current condition;
measuring a current duration of each of the plurality of timed events, wherein the current duration corresponds to the duration of the respective timed event while performing the process cycle under the current condition;
ordering the current durations of the plurality of timed events in the process sequence; and
generating a current heartbeat defined by the ordered current durations.

9. The method of claim 8, further comprising:
determining a current event variance between the current duration and the learnt duration for each of the plurality of timed events.

10. The method of claim 9, further comprising:
determining a current cumulative variance between the current heartbeat and the learnt heartbeat;
wherein the current cumulative variance is defined by the sum of the current event variances of the plurality of timed events.

11. The method of claim 10, further comprising:
generating a message in response to one of the current event variance and the first current cumulative variance.

12. The method of claim 11, wherein the message is at least one of:
a maintenance indicator;
a cycle time indicator; and
a shutdown signal.

13. The method of claim 8, further comprising:
generating a plurality of current heartbeats, wherein each respective heartbeat of the plurality of current heartbeats is defined by a respective current process cycle performed under a respective current condition at a respective time;
associating each respective heartbeat of the plurality of current heartbeats with the respective time; and
comparing each respective heartbeat of the plurality of current heartbeats with a plurality of prior heartbeats;
wherein the plurality of prior heartbeats includes two or more of the baseline heartbeat, the learnt heartbeat, and current heartbeats generated prior to the respective time associated with the respective heartbeat.

14. The method of claim 13, wherein comparing each respective heartbeat of the plurality of current heartbeats with a plurality of prior heartbeats includes at least one of:
determining a current event variance between the current duration of the respective heartbeat and the learnt duration for each of the plurality of timed events;
determining a current cumulative variance between the respective heartbeat and the learnt heartbeat;
wherein the current cumulative variance is defined by the sum of the current event variances of the plurality of timed events; and
identifying a process trend defined by the respective heartbeat and the plurality of prior heartbeats.

15. The method of claim 14, further comprising:
generating a message in response to one of the current event variance of the respective heartbeat, the current cumulative variance of the respective heartbeat, and the process trend.

16. A system for generating a heartbeat of a process, wherein the process includes at least one machine performing a process cycle, wherein the process cycle consists of a plurality of timed events performed in a process sequence, the system comprising:
a server in communication with the at least one machine and configured to generate a heartbeat for the at least one machine, wherein the server generates the heartbeat by:
receiving measurements of the duration of each of the plurality of timed events, wherein the duration of each of the timed events corresponds to the duration of the timed event while the at least one machine is performing the process cycle under an identified condition;
ordering the durations of the plurality of timed events in the process sequence; and
generating a heartbeat for the identified condition defined by the ordered durations.

17. The system of claim 16, wherein the identified condition is one of:
a design intent condition defining a baseline heartbeat;
a known condition defining a learnt heartbeat; and
a current condition defining a current heartbeat.

18. The system of claim 17, wherein the server is configured to:
determine a learnt event variance between the learnt duration and the baseline duration for each of the plurality of timed events;
determine a current event variance between the current duration and the learnt duration for each of the plurality of timed events;
determine a learnt cumulative variance between the learnt heartbeat and the baseline heartbeat, wherein the learnt cumulative variance is defined by the sum of the learnt event variances of the plurality of timed events; and
determine a current cumulative variance between the current heartbeat and the learnt heartbeat, wherein the current cumulative variance is defined by the sum of the current event variances of the plurality of timed events.

19. The system of claim 18, wherein the server is configured to generate a message based on one of the current event variance and the current cumulative variance.

20. The system of claim 19, wherein the message is one of:
a maintenance indicator; and
a cycle time indicator.

21. The system of claim 19, wherein the message is a shutdown signal providing to the at least one machine.

22. The system of claim 19, further comprising:
an interface device in communication with the server;
wherein the interface device is configured to receive the message from the server and to output the message to one of a user interface and the at least one machine.

23. The system of claim 22, wherein the user interface includes one of a display and an alarm.

24. The system of claim 22, wherein the interface device is a programmable controller in communication with the at least one machine and configured to measure the duration of each of the plurality of timed events.

25. The system of claim 19, further comprising:
a database in communication with the server and configured to store a plurality of prior heartbeats generated by the server;
wherein the server if configured to compare a respective current heartbeat with the plurality of prior heartbeats; and
wherein the plurality of prior heartbeats includes at least two of:
the baseline heartbeat;
the learnt heartbeat; and
a prior heartbeat;
wherein the prior heartbeat is defined by the current heartbeat generated prior to the time associated with the respective current heartbeat.

26. The system of claim 25, wherein the server is configured to generate a message based on one of:
the current event variance of the respective current heartbeat;
the current cumulative variance of the respective current heartbeat;
and a process trend including the respective current heartbeat.

* * * * *